United States Patent
Eardley et al.

(10) Patent No.: US 9,742,705 B2
(45) Date of Patent: Aug. 22, 2017

(54) SIGNALLING CONGESTION

(71) Applicant: BRITISH TELECOMMUNICATIONS PUBLIC LIMITED COMPANY, London (GB)

(72) Inventors: Philip L Eardley, London (GB); Robert J Briscoe, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 2 days.

(21) Appl. No.: 14/765,642

(22) PCT Filed: Feb. 6, 2014

(86) PCT No.: PCT/GB2014/000046
§ 371 (c)(1),
(2) Date: Aug. 4, 2015

(87) PCT Pub. No.: WO2014/125239
PCT Pub. Date: Aug. 21, 2014

(65) Prior Publication Data
US 2015/0372949 A1    Dec. 24, 2015

(30) Foreign Application Priority Data
Feb. 13, 2013    (EP) .................................. 13250017

(51) Int. Cl.
*H04L 12/861*    (2013.01)
*H04L 12/935*    (2013.01)
(Continued)

(52) U.S. Cl.
CPC .............. *H04L 49/90* (2013.01); *H04L 47/12* (2013.01); *H04L 47/326* (2013.01);
(Continued)

(58) Field of Classification Search
None
See application file for complete search history.

(56) References Cited

U.S. PATENT DOCUMENTS 6,192,029 B1 * 2/2001 Averbuch ................ H04L 45/00
                                                            370/229
2007/0230493 A1  10/2007 Dravida et al.
(Continued)

OTHER PUBLICATIONS

International Search Report for PCT/GB2014/000046, dated Mar. 19, 2014, 4 pages.
(Continued)

*Primary Examiner* — Edan Orgad
*Assistant Examiner* — Saumit Shah
(74) *Attorney, Agent, or Firm* — Nixon & Vanderhye PC

(57) ABSTRACT

Congestion in respect to a network element operable to forward data items in a telecommunications networks, and in respect to a processing element operable to process requests for service is signaled. In either, the element is operable to perform its processing function at up to a processing rate which is subject to variation, and has a queue for items awaiting processing having a counter associated therewith which maintains a count from which a queue metric is derivable. A method comprises: updating the count at a rate dependent on the processing rate; further updating the count in response to receipt of items awaiting processing; and signalling a measure of congestion in respect of the element in dependence on the queue metric; then altering the rate at which the count is being updated and adjusting the counter whereby to cause a change in the queue metric if the processing rate has changed.

17 Claims, 5 Drawing Sheets

Operation of modified Virtual Queue technique

(51) Int. Cl.
*H04L 12/931* (2013.01)
*H04L 12/823* (2013.01)
*H04L 12/801* (2013.01)
*H04L 12/841* (2013.01)

(52) U.S. Cl.
CPC .......... *H04L 49/3045* (2013.01); *H04L 49/50* (2013.01); *H04L 49/508* (2013.01); *H04L 47/283* (2013.01)

(56) References Cited

U.S. PATENT DOCUMENTS

| | | | |
|---|---|---|---|
| 2009/0046581 A1* | 2/2009 | Eswaran | H04L 43/0876 370/230 |
| 2010/0046375 A1* | 2/2010 | Goldstein | H04L 41/0631 370/237 |
| 2010/0208591 A1* | 8/2010 | Corliano | H04L 47/10 370/237 |
| 2010/0214912 A1 | 8/2010 | Khaddam | |
| 2012/0170472 A1 | 7/2012 | Chen et al. | |
| 2013/0188511 A1* | 7/2013 | Avni | H04L 47/245 370/253 |

OTHER PUBLICATIONS

Written Opinion of the ISA for PCTGB2014/000046, dated Mar. 19, 2014, 8 pages.
International Preliminary Report on Patentability for PCT/GB2014/000046, dated Jan. 23, 2015, 6 pages.
Search Report for EP 13 25 0017, dated Apr. 16, 2013, 4 pages.
Ramakrishnan et al., "A Proposal to add Explicit Congestion Notification (ECN) to IP", RFC 2481, AT&T Labs Research, Jan. 1999, 26 pages.
Lapsley et al., "Random Early Marking: an Optimisation Approach to Internet Congestion Control", Proceedings of the 7th IEEE International Conference on Networks, Sep. 28-Oct. 1, 1999), 8 pages.
Eardley, "Metering and Marking Behaviour of PCN-Nodes", RFC 5670, Nov. 2009, 20 pages.
Gibbens et al., "Resource Pricing and the Evolution of Congestion Control", Statistical Laboratory, University of Cambridge, (Automatica 35, 1999), 35 pages.
Courcoubetis et al., "Buffer Overflow Asymptotics for a Buffer Handling Many Traffic Sources", J. Appl. Prob. 33,1996, pp. 886-903.
Kunniyur et al., "Analysis and Design of an Adaptive Virtual Queue (AVQ) Algorithm for Active Queue Management", ACM Digital Library, Proceedings of the 2001 Conference on Applications, Technologies, Architecture, and Protocols for Computer Communication, Aug. 27-31, 2001, 12 pages.
Zhang et al., "Performance Evaluation of Pre-Congestion Notification", (International Workshop on Quality of Service (IWQoS), Jun. 2008), pp. 204-208.

* cited by examiner

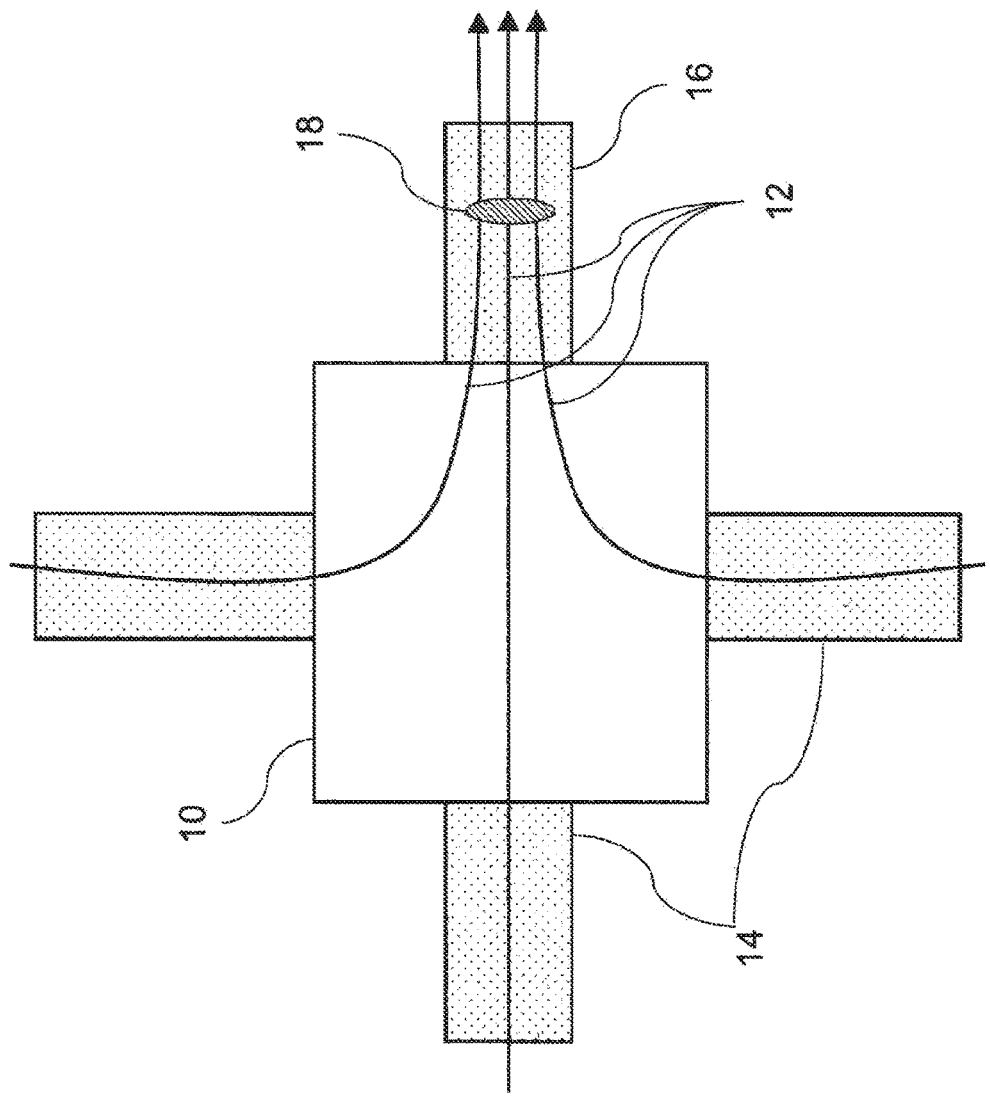
Figure 1 - Overview of a network element
PRIOR ART

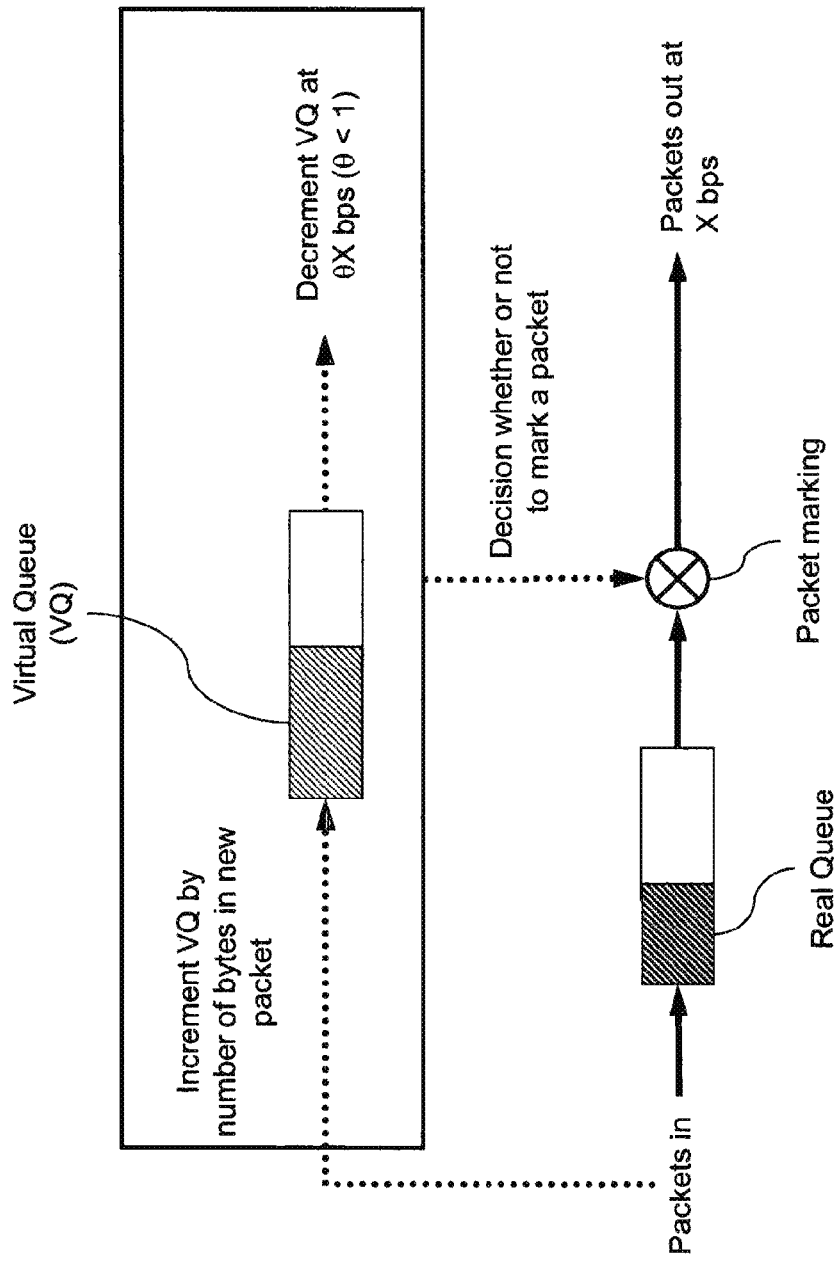
Figure 2 – Virtual Queue Marking (VQM)
PRIOR ART

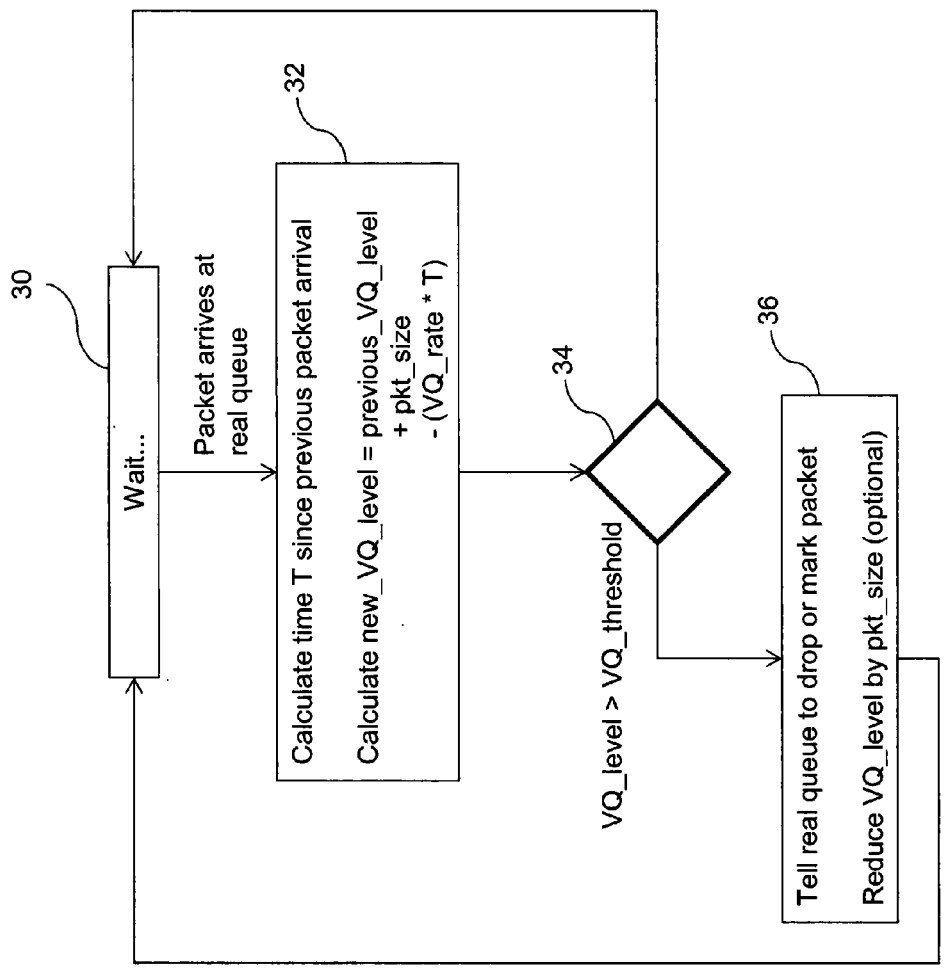
Figure 3 – Normal Operation of Virtual Queue

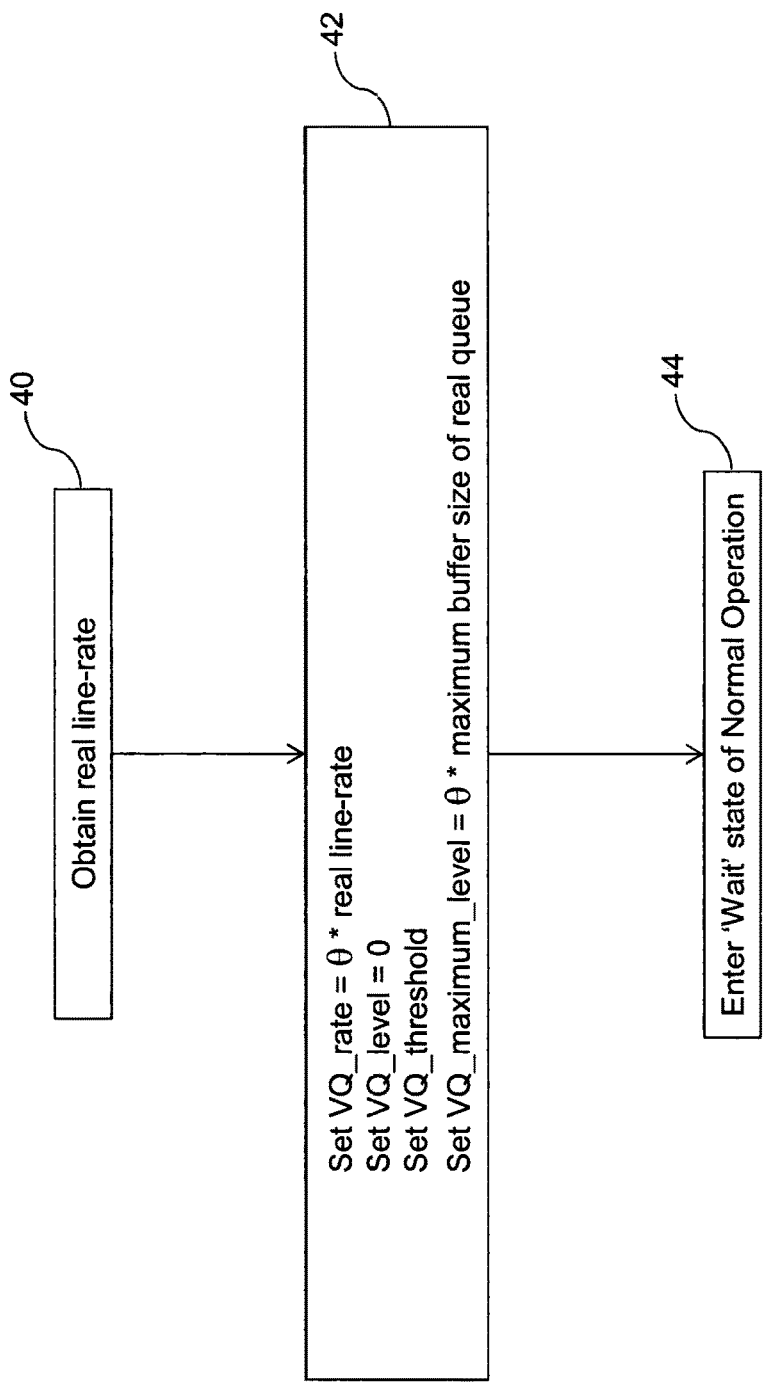
Figure 4 – Initialisation of Normal Operation

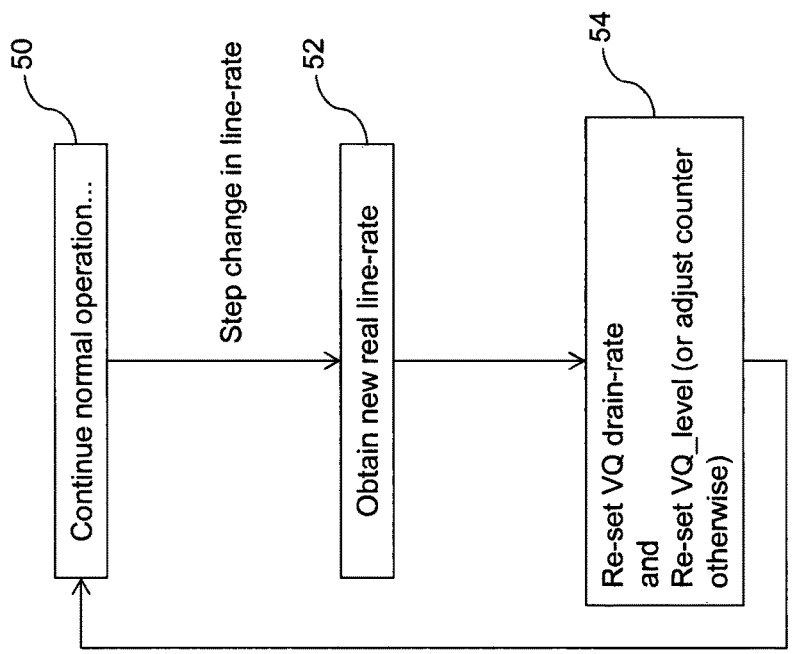
Figure 5 – Operation of modified Virtual Queue technique

SIGNALLING CONGESTION

This application is the U.S. national phase of International Application No. PCT/GB2014/000046 filed 6 Feb. 2014 which designated the U.S. and claims priority to EP Patent Application No. 13250017.4 filed 13 Feb. 2013, the entire contents of each of which are hereby incorporated by reference.

TECHNICAL FIELD

The present invention relates to methods and apparatus for signalling congestion. Aspects of the present invention relate to telecommunications networks such as the Internet, an intranet, or a core network of a network operator, and to signalling congestion in respect of a network element operable to forward received data items. Other aspects relate to the processing of requests for service by a processing element, and to signalling congestion in respect of a processing element operable to process received requests for service.

BACKGROUND TO THE INVENTION AND PRIOR ART

Packet Networks such as Internet Protocol (IP) networks or Ethernet networks typically operate on a "Best Efforts" basis. This means that they (or the network elements of which they are comprised) usually forward their data units or packets quickly across the network, but may occasionally experience congestion when they receive more packets than can be forwarded quickly. In this case they typically delay or drop excess packets, which may cause inconvenience to the senders or receivers of the packets.

Techniques have been developed to provide a more discriminating forwarding behaviour by, for example, giving some packets priority, or higher priority than others, based for example on which of a number of different traffic classes they are identified as belonging to, or on their source or intended destination. Such techniques typically need to be complemented by mechanisms such as Admission Control mechanisms which may be used to control the rate at which the high (or higher) priority packets enter the network, in order to prevent them from being able to congest or monopolise the resources of the network to the extent that they completely exclude packets having lower priority from the network. By appropriate use of such mechanisms and appropriate configuration, the resources available to the network may effectively be partitioned in such a way as to ensure that the network will not accept higher priority packets at a higher rate than the rate at which the network can actually guarantee to provide such packets with priority treatment, while also ensuring that packets having lower priority cannot be completely excluded.

Other schemes for controlling congestion rely on the network (or the network elements therein) providing a signal to the senders or receivers of packets (or other types of data units) when congestion is experienced allowing them to "back-off" (i.e. to reduce the rate at which data units are being sent) in response thereto, and thereby alleviate the congestion. Such schemes generally rely on sources taking responsibility for the rate at which they send data by implementing congestion control mechanisms, but it is generally in their interests to do so, because if sources persist in sending traffic through a congested network or via a congested network element router, it could become (more) seriously overloaded or congested, leading to (more) traffic being dropped and other network elements becoming congested as well. It is therefore generally in the interest of sources to monitor feedback signals that characterise path congestion in order to detect when a path their data is following is getting congested, in which case they react by reducing their throughput. They may slowly increase their rate when there is no sign of the path becoming congested.

Typical path characterisation metrics that sources monitor are average roundtrip time (RTT) for the data path, variance of the roundtrip time (jitter) and level of congestion on the path.

The congestion level can be signalled either implicitly (through congested routers dropping packets when their buffers overflow or to protect themselves) or explicitly (through mechanisms such as explicit congestion notification—see later). Currently the most common option is implicit signalling.

Sources using Transmission Control Protocol (TCP) are able to detect losses, because a packet loss causes a gap in the sequence; whenever a TCP source detects a loss, it is meant to halve its data transmission rate, but no more than once per round trip time, which alleviates the congestion on the network element at the bottleneck.

Recent approaches to managing congestion in the Internet and other networks require network elements such as routers (or switches) in the network to perform Active Queue Management (AQM) and to signal congestion using some marking scheme. In such approaches, a router may choose a proportion of the packets being forwarded based on its current congestion level, and mark them with a congestion mark, typically using a protocol such as ECN (RFC 2481—A Proposal to add Explicit Congestion Notification (ECN) to IP). If the router is uncongested, then very few packets (or no packets) will be marked. If the router is congested many (or all) packets will be marked. As will become apparent, by network elements marking (rather than dropping) packets, thereby allowing senders to react to marks on forwarded packets (rather than detected packet drops), it becomes possible to avoid congestion reaching a level at which packet drops are necessary at all.

With reference to FIG. 1, an overview of a generalised network element 10, such as a router or switch, is shown. Flows of packets 12 arrive at the network element from other nodes in a network via one or more network interfaces 14, and are presented for onward transmission to other nodes in the network via another network interface 16. If the network element 10 is performing a packet marking process to indicate congestion, a packet-marking means 18 is present at the network element 10 or at one or more of its network interfaces 16.

Existing mechanisms for marking packets are typically based upon inspecting the real queue of packets at the router (or switch) interface and marking the packets if this queue is long (i.e. above a predetermined threshold). An example of such an approach is given in "Random Early Marking: An Optimization Approach to Internet Congestion Control" by David Lapsley and Steven Low (Proceedings of the 7th IEEE International Conference on Networks, 28 Sep.-1 Oct. 1999). Such techniques are not difficult to implement with current switches and routers, but they are not entirely satisfactory because they do not start to signal congestion until the real queue has started to grow in size. It is preferable generally to operate the network so that real queues very seldom grow in size since long queues mean increased latency and packet loss. Thus it would be better if the marking mechanism could start marking in the presence of imminent congestion before the real queue start to grow. This is the idea of virtual queue marking.

Random Early Marking, also called Random Early Detection (RED), randomly drops/marks packets with a probability "p" that depends upon the smoothed queue "$q_{ave}$". In a RED-based AQM, a smoothed queue $q_{ave}$ is continuously estimated by means of an exponentially-weighted moving average (EWMA) of the real queue "q":

$$q_{ave} \leftarrow (1-w_q)q_{ave} + w_q q$$

where "$w_q$" is the weight given to the real queue's length. Many algorithms have been proposed for how to relate the smoothed queue $q_{ave}$ to the probability of marking (or dropping) a packet. For example, in the algorithm known as the "Gentle" variant of RED, when the smoothed queue size gave is below a minimum threshold "$q_0$" then no packets are dropped/marked. When $q_{ave}$ is between "$q_0$" and "$q_1$" then packets are discarded with a probability p, between 0 and $p_1$, which is linearly proportional to $q_{ave}$. When $q_{ave}$ is greater than threshold $q_1$ then probabilistic dropping/marking continues with an increased probability ranging between $p_1$ and $p_{max}$, which still depends linearly on gave.

One significant practical problem with RED is that it is very sensitive to the setting of the parameters.

Because RED uses a smoothed queue, a sudden burst of packets can still lead to many packets being in the real queue—and hence significant delays to packets—before the smoothed queue increases enough for RED to start (randomly) dropping or marking packets (and thereby signal to senders to "back-off").

RED is widely used in today's Internet because it allows sources to react more promptly to incipient congestion and it keeps queues from growing unnecessarily long. Equipment vendors have implemented variants of RED, e.g. Cisco's proprietary implementation is known as "Weighted Random Early Detection" (WRED).

Virtual Queue Marking

An example of such early marking has been standardised in the IETF PCN Working Group (http://www.ietf.org/html.charters/pcn-charter.html), where PCN refers to "Pre-Congestion Notification". This working group has standardised two marking mechanisms based on looking at how the arrival rate of packets compares not to the line-rate (as the real queue does) but instead to a slightly reduced rate. These are specified in RFC 5670: "Metering and Marking Behaviour of PCN-Nodes" (P. Eardley, November 2009). This "virtual queue" experiences congestion before the real queue, and hence can provide more timely congestion signals. An academic discussion of the advantages of such a mechanism is given in "Resource pricing and the evolution of congestion control" by R. J. Gibbens and F. P. Kelly (Automatica 35, 1999). Virtual queues were first proposed in a different form (and for use in ATM networks) in "Buffer Overflow Asymptotics for a Switch Handling Many Traffic Sources" by Costas Courcoubetis and Richard Weber (Journal of Applied Probability 33, pages 886-903, 1996). The precise form discussed here was proposed by Kunniyur and Srikant in "Analysis and Design of an Adaptive Virtual Queue (AVQ) Algorithm for Active Queue Management" (Proc. ACM SIGCOMM'01, Computer Communication Review 31 (4), October 2001).

It will be noted that the term "virtual queue" is also used in switch and router hardware design to denote a virtual queue on an ingress interface that tracks the queue on an egress interface, but this has no relation to the virtual queue discussed here.

Virtual Queue Marking (VQM) defines a strategy—to be implemented on network interfaces—to mark packets of a packet-switched network with a signal expressing the state of congestion of that interface. This packet marking strategy is based on a congestion measurement defined by a virtual queue. A virtual queue is a conceptual queue that is actually simply a single variable recording the length of the virtual queue, where the lengths (i.e. sizes) of packets are added to it as they arrive while some fraction of the actual line-rate of that interface is subtracted at the same time. This means that an interface's virtual queue builds up more rapidly than its real queue. Typically the marking algorithm is based on the instantaneous length of the virtual queue, rather than its smoothed value. Therefore most of the time the real queue is essentially empty—at most a couple of packets—so there are no buffering or re-transmission delays, and the end-to-end latency can approach the underlying 'speed of light' transmission time. However, there is still plenty of buffer available to absorb a temporary burst of traffic (for instance during TCP's start-up phase). No packets need ever be dropped (if marking is used as the signalling technique, rather than dropping).

Another advantage of the virtual queue compared with RED is that the marking algorithm can be simplified. For example, in "Performance Evaluation of Pre-Congestion Notification" by X. Zhang and A. Charny (International Workshop on Quality of Service (IWQoS), Enschede, The Netherlands, June 2008) showed using simulations that a simple 'step' marking algorithm can be used. In this, no packets are marked/dropped if the length of the virtual queue is less than a threshold, and all are marked/dropped if it is above. The paper also shows that the results are fairly insensitive to the exact parameter value.

It is of course possible to operate a virtual queue based on its smoothed virtual queue (VQ) length and for the algorithm to be more complex than a simple step function (for example a probabilistic scheme akin to Gentle RED).

Virtual queues have been implemented by several vendors, for example Broadcom in their Triumph and Scorpion switches and Cisco in their Nexus 5xxx and 7xxx range of switches. Broadcom chips are also used by most vendors of mid-range switches.

FIG. 2 shows a model illustrating a Virtual Queue Marking (VQM) process. As each new packet arrives and is added to the real queue, the size of the virtual queue is incremented by the number of bytes in the new packet (or by a unit amount, which may be applicable in cases where packets are equal or similar in size, or where it is appropriate to treat them as such). If packets are able to be presented for onward transmission to other nodes in the network at an "actual line-rate" of X bytes per second (bps), the virtual queue is decremented at a "virtual drain-rate" of θX bps, where θ<1. (Typically, θ is close to but slightly less than 1, e.g. 0.98.).

The size of the virtual queue (rather than of the actual queue) is then used to decide whether or not to send a congestion signal (i.e. a signal expressing a state of congestion for that interface). Typically a congestion signal would be sent if the size of the virtual queue exceeds some threshold. There are several ways of coding a congestion signal; a desirable way is to 'mark' a packet, by setting a bit in the packet header to 1 if the signal is 'congested interface', or to 0 if the signal is 'uncongested interface'. Another possible way of using the measurement of congestion that the virtual queue provides, rather than marking packets, is to send an alert to a management system. Alternatively (but less desirably in most circumstances), the traffic class of the real packet may be re-marked, or the real packet might be dropped or re-routed. Various other types of action or sanction, punitive or non-punitive, may be used.

Virtual queue work to date has been based on the assumption that the line-rate of X bytes per second is fixed and therefore the rate at which the virtual queue is decremented of θX is set at configuration time. However, there are in fact circumstances when the real line-rate will vary. Examples include a wireless interface changing its rate, or if the line is actually a virtual link such as a tunnel where the underlying path changes. In such circumstances, the present inventors have identified that it would be appropriate for the virtual queue rate to be altered to reflect the new line-rate, $X_{new}$, i.e. setting it to $\theta X_{new}$. In addition to this, and as will be explained later, they have identified a further, separate adjustment that can also be made in such circumstances in order to improve the response so that any measure of congestion signalled (by marking, dropping or otherwise) more accurately reflects the near-term danger of packets (or other data units) being dropped by the real queue or otherwise failing to be forwarded as intended.

Referring to earlier patent applications of possible background relevance to techniques that use "counters" and "counts" (albeit not in relation to "virtual queue" techniques), US2007/230493 ("Dravida et al") relates generally to wireless communications, and more particularly to a memory management technique for high speed media access control.

SUMMARY OF THE INVENTION

According to a first aspect of the present invention, there is provided a method of processing data items received at a network element in a communications network, the network element being operable to forward data items at a rate up to a forwarding rate, the forwarding rate being subject to variation; the network element having a queue for data items awaiting forwarding and having a counter associated therewith, the counter maintaining a count in dependence on which a queue metric is derivable according to a predetermined algorithm; the method comprising:

updating the count at a rate dependent on the forwarding rate;

further updating the count in response to receipt of data items; and signalling a measure of congestion in respect of the network element in dependence on said queue metric;

the method further comprising:

determining if there has been a variation in the forwarding rate, and in response to a determination that there has been a variation in the forwarding rate:

altering the rate at which the count is being updated in accordance with the variation in the forwarding rate; and adjusting the counter in dependence on the variation in the forwarding rate whereby to cause a change in the queue metric.

According to preferred embodiments, the forwarding rate may signify the number of data items that the network element is operable to forward in a unit of time. Alternatively, the forwarding rate may signify the volume of data that the network element is operable to forward in a unit of time. The choice of whether the forwarding rate signifies "number of data items" or "volume of data" (or another such characteristic) may be taken in dependence on whether any signalling performed in dependence thereon is required to be influenced by the number of data items or volume of data (or some other characteristic), which may depend on whether data items are expected to be of essentially the same size or not, or what characteristic is deemed to be of importance in relation to congestion and to the use of shared resources. The forwarding rate (whether measured in terms of numbers of data items, volumes of data or otherwise) may be the maximum rate at which the network element is able to perform its function (measured by the network element itself or otherwise determined), or may be a rate that is imposed on the network element by a control entity, for example.

Correspondingly, according to preferred embodiments, the step of further updating the count may be performed in dependence on the number of data items received and/or the rate at which data items are received. Alternatively, the step of further updating the count may be performed in dependence on the volume of data received and/or the rate at which data is received.

According to preferred embodiments, the queue metric may be a measure of the level of the count, or may be the count itself. Alternatively, the queue metric may be an averaged measure dependent on measures of the level of the count over a period of time, such as a weighted moving average (exponentially-weighted or otherwise).

According to some embodiments, the queue metric may be a measure of disparity between the count and a counter threshold. In such embodiments, the step of adjusting the counter in response to a determination that there has been a variation in the forwarding rate may comprise updating the count. Alternatively, the step of adjusting the counter in response to a determination that there has been a variation in the forwarding rate may comprise updating the counter threshold.

According to preferred embodiments, the step of signalling a measure of congestion may comprise performing one or more actions in respect of said data items in dependence on said queue metric. The step of signalling a measure of congestion may comprise determining whether or not to perform said one or more actions in dependence on the state of said queue metric (in what may be regarded as "deterministic" embodiments). This may involve determining whether the queue metric is above or below a threshold, for example, and deciding whether or not to mark, drop, truncate or delay data items, for example (or to perform whatever the chosen signalling action is on those data items) based on that determination. Alternatively, the step of signalling a measure of congestion may comprise performing said one or more actions with a probability dependent on said queue metric (in what may be regarded as "probabilistic" embodiments). This may involve marking, dropping, truncating or delaying data items, for example (or performing the chosen signalling action on those data items) with a probability dependent on the queue metric. The function may be such that the probability can be as low as zero or as high as one in respect of one, some or each of the data items, the probability being anywhere in that range in dependence on the queue metric, or the function may be such that the probability lies within a more restricted range. In another alternative, the step of signalling a measure of congestion may comprise performing one or more actions in respect of data items to an extent dependent on the queue metric. This may involve delaying data items (or performing the chosen signalling action on those data items) by an amount that depends on the queue metric, for example.

According to preferred embodiments, the step of signalling a measure of congestion may comprise marking data items in dependence on the queue metric. Alternatively or additionally, the step of signalling may involve performing one or more of the following actions in respect of one or more of said data items in dependence on said queue metric: dropping; truncating; delaying; de-prioritising; re-routing; forwarding to a destination other than an intended destination; issuing an out-of-band congestion notification.

According to a second aspect of the present invention, there is provided a method of processing requests for service received at a processing element, the processing element being operable to process requests for service at a rate up to a processing rate, the processing rate being subject to variation; the processing element having a queue for requests awaiting processing and having a counter associated therewith, the counter maintaining a count in dependence on which a queue metric is derivable according to a predetermined algorithm; the method comprising:

updating the count at a rate dependent on the processing rate;

further updating the count in response to receipt of requests for service; and signalling a measure of congestion in respect of the processing element in dependence on said queue metric;

the method further comprising:

determining if there has been a variation in the processing rate, and in response to a determination that there has been a variation in the processing rate:

altering the rate at which the count is being updated in accordance with the variation in the processing rate; and adjusting the counter in dependence on the variation in the processing rate whereby to cause a change in the queue metric.

Options and preferred embodiments corresponding to those referred to above in relation to the first aspect are also applicable in relation to the second aspect.

Related to the first aspect, there is also provided an apparatus such as a network element for performing a method according to the first aspect.

Related to the second aspect, there is also provided an apparatus such as a processing element for performing a method according to the second aspect.

As will be explained in more detail below, methods and apparatus according to preferred embodiments of the invention thus use a "virtual queue" technique in which a count (which may be regarded as representing the length of a virtual queue) is adjusted in a manner that is not done according to prior art techniques. In particular, as well as altering the rate at which the count is being updated in response to a determination that there has been a variation in the actual rate at which an element is operable or able to perform its processing task (which may comprise forwarding data items, or more generally, processing requests for service), the count representing the length of the virtual queue itself is also adjusted.

Alternatively, as will be explained, instead of or as well as simply adjusting the count, other adjustments may be made to the counter responsible for maintaining the count whereby to cause a change in a queue metric in dependence on which signalling is done. Using such alternatives, signalling may be performed in dependence on queue metrics such as the smoothed length of the virtual queue, for example.

In comparison with preferred or other embodiments, if the virtual drain-rate alone were to be altered (with marking being performed in dependence on the virtual queue length in order to signal to TCP sources that they should adjust their sending rates), the marking rate may eventually become correct, and the applied marks should eventually cause sources to adjust their sending rates so as to resume the normal operation of sources over a network that uses virtual queues. In the short term, however, the marking rate will not generally reflect the actual danger of the real queue growing. In the case where the actual line-rate has reduced, there is a danger that the real queue will grow before there are enough marks to trigger the sources to slow down. In the case where the actual line-rate has increased, the danger is that the sources will slow down more than they need to.

As will be explained in detail below, according to preferred embodiments in which as well as altering the rate at which the count representing the length of the virtual queue is being updated, the count itself is adjusted, signalling based thereon can reflect changes to the real queue quicker and more accurately than is possible merely by altering the drain-rate. If (as is the case with preferred embodiments) the signalling involves signalling congestion by marking data items (such as packets) in dependence on the count itself, the number of data items marked (or the rate at which they are being marked) may therefore indicate more quickly and more accurately to TCP sources that they should reduce their sending rates or may increase their sending rates.

BRIEF DESCRIPTION OF THE DRAWINGS

A preferred embodiment of the present invention will now be described with reference to the appended drawings, in which:

FIG. 1 shows an overview of a network element, such as a router or switch;

FIG. 2 shows a model illustrating a Virtual Queue Marking (VQM) process;

FIG. 3 illustrates the normal operation of a Virtual Queue;

FIG. 4 illustrates an initialisation stage in the operation of a Virtual Queue; and FIG. 5 illustrates a modification to the normal operation of a Virtual Queue according to a preferred embodiment.

DESCRIPTION OF PREFERRED EMBODIMENTS OF THE INVENTION

With reference to the accompanying figures, methods and apparatus according to preferred embodiments for processing data items received at a network element in a communications network, and for signalling a measure of congestion in respect of the network element, will be described particularly with reference to FIG. 5. Firstly, however, a technique using what may be thought of as the "normal" operation of a Virtual Queue technique will be described with reference to FIGS. 3 and 4.

Referring to FIG. 3, a network element 10 such as that shown in FIG. 1 remains in a "Wait" state 30 until a packet arrives in the real queue of the network element 10 (or of an individual interface 14 thereof). It then proceeds to a "Calculation" step 32, in which the time "T" since the arrival of the previous packet is calculated. From this, the new level of the virtual queue "new_VQ_level" is obtained from the previous level of the virtual queue "previous_VQ_level" by adding an amount corresponding to the size of the newly-received packet "pkt_size" and subtracting an amount corresponding to the product of the virtual queue's drain-rate and the time "T" since the previous arrival, i.e. "VQ_rate*T". Thus:

$$new\_VQ\_level = previous\_VQ\_level + pkt\_size - (VQ\_rate * T)$$

(NB It will be appreciated that the updating of the virtual queue level based on the drain-rate may be done continually, or on an ongoing basis, rather than simply each time a new packet arrives—the effect can be the same.)

The process then proceeds to a "Comparison" step 34, in which the (new) level of the virtual queue is compared with the virtual queue's threshold (i.e. a predetermined length of the virtual queue at which packets are to be dropped or marked, or at which a particular sanction or other such action is to be taken). If the (new) level of the virtual queue is found to be greater the virtual queue's threshold (i.e. if VQ_level>VQ_threshold), the process continues to step 36 (discussed below), otherwise it returns to the "Wait" state 30, and remains there until another packet arrives in the real queue.

In step 36, an instruction is sent to the real queue to drop or mark the packet (or another packet—it need not be the specific packet that has just arrived), or otherwise take the predetermined type of action to signal imminent congestion, or the onset thereof. In addition to this, the level of the virtual queue may be reduced by an amount corresponding to the size of the packet the processing of which has resulted in the level passing the threshold. (This may be done in order to clear the virtual queue sufficiently to allow a smaller packet to be received subsequently that doesn't result in a further "overflow" indication to be sent, but in some embodiments, this reduction need not be done.) The process then returns to the "Wait" state 30, and remains there until another packet arrives in the real queue.

As will be appreciated, a process such as that described above with reference to FIG. 3 may continue indefinitely, but for the sake of completeness, it should be noted that there are various ways in which it could be initiated, either for the first time in the case of a particular network element or interface, or in the event of a re-set.

Referring to FIG. 4, a possible initialisation stage in the normal operation of a Virtual Queue will therefore be described.

In step 40, a value for the real/actual line-rate is obtained. The real line-rate may be discovered, e.g. by the network element performing a measurement of the maximum rate that is possible in current conditions, or it may be imposed (due to a contract, or otherwise), possibly on the instruction of a separate control entity.

In step 42, various values may be set, including the following, for example:
- The virtual queue's drain-rate "VQ_rate" may be set as a suitably chosen multiple "θ" (generally slightly less than 1, as explained earlier) of the real line-rate.
- The virtual queue's level "VQ_level" may be set at an initial level, such as its "zero" level (which may be appropriate prior to any packets arriving, let alone causing any congestion).
- The virtual queue's threshold "VQ_threshold" (i.e. for dropping, marking, or otherwise taking action) may be set at a predetermined level or otherwise.
- The virtual queue's maximum level "VQ_maximum_level" may be set as a suitably chosen multiple (possibly θ) of the maximum buffer size of the real queue, or otherwise.

The operation of the virtual queue may then proceed (via step 44) to the 'Wait' state 30 of its ongoing process.

Referring now to FIG. 5, a preferred embodiment, in which further adjustment is made while performing a virtual-queue-based process such as that explained with reference to FIG. 3, will now be explained. By virtue of this, congestion signalling (by marking, dropping or otherwise) can more accurately reflect the near-term danger of packets (or other data units) being dropped by or from the real queue, or otherwise failing to be forwarded as intended.

During normal operation (and while the real line-rate is static or stable), the network element may operate in its normal fashion (i.e. according to the process of FIG. 3, having been initialised according to the process of FIG. 4, for example). This normal operation during periods when the actual line-rate is static or stable is symbolised by step 50 in FIG. 5. The length of the virtual queue is therefore increased when a packet arrives, by the size of the packet in bytes (in the presently-described embodiment). In addition, its length is decreased at the rate θX, typically with the rate-based decreases also being imposed at packet arrival, calculated according to the time since the previous packet arrival (although as explained earlier, the rate-based decreasing of the virtual queue length may be done on a continuous or ongoing basis). The packet (or one or more other packets) is marked if the length of the virtual queue is greater than a threshold value, and otherwise not. This may be done in a manner such as or similar to the operation of the threshold-meter described in RFC 5670 (although that description is written in terms of a "token bucket", but this is functionally equivalent to a description in terms of a virtual queue (essentially described the other way up)—see Appendix A1 of RFC 5670 for an example algorithm that implements the defined behaviour).

In the event that there is a variation in the actual line-rate, however (e.g. any step-change, a change above a predetermined amount, or a change in the actual line-rate that is occurring at a higher rate than a predetermined rate of change, for example), the process of FIG. 5 is triggered, and the network element proceeds from step 50 to step 52, as will be discussed later.

Firstly, it should be appreciated that here are various ways in which the network element may determine that there has been a variation in the actual line-rate. Typically this may be via the Application Programming Interface (API) of the network card. The API could regularly poll the network card, making regular-polling Requests expressible in SNMP terms in the form: "What is the current line-rate", and receiving responses of the form: "Line-rate is <value>". Alternatively, the API could be interrupt-driven (e.g. by setting an SNMP "trap"), i.e. submitting a Request expressible in the form: "Inform me if the line-rate changes, otherwise keep quiet", and occasionally receiving Responses of the form "Line-rate has just changed and is now <value>". The polled mechanism may be preferable where the line-rate changes frequently, whilst the interrupt method may be preferable where the line-rate only changes occasionally.

If it is determined (by either of the techniques set out above, or otherwise) that there has been a variation in the actual line-rate (i.e. the rate up to which the network element is able or operable to forward data items) i.e. from X bps to $X_{new}$ bps, for example, two changes are made in respect of the virtual queue-based process. The order of which is not generally important—they may be done in either order or simultaneously.

(i) The virtual queue drain-rate is updated to be $\theta X_{new}$.
(ii) In the presently-described embodiment, the count representing the length of the virtual queue is adjusted (although as will be explained later, according to other embodiments, other parameters of or associated with the virtual queue may be adjusted instead to cause the same, a similar, or a corresponding effect).

In the presently-described embodiment, the adjustment to the count representing the length of the virtual queue is done as follows:

If the new actual line-rate is greater than the previous actual line-rate, the virtual queue length is reduced (in order to reflect that there is a lower danger that the real queue will start to grow). A preferred option here, on account of being simple to implement, is to set the virtual queue length count to some predetermined value that is significantly below the marking threshold, such as its "zero" level, so decreasing the probability of marking (or dropping, etc.) the next few packets.

If, on the other hand, the new actual line-rate is less than the previous actual line-rate, the virtual queue length is increased (in order to reflect that there is a greater danger that the real queue will start to grow). A preferred option here, again on account of being simple to implement, is to set the virtual queue length count equal to some predetermined value that is significantly larger than the marking threshold, such as its "maximum" level, so increasing the probability of marking (or dropping, etc.) the next few packets.

The virtual queue then returns to operating according to its "Normal Operation" process (such as that illustrated in FIG. 3), and may continue operating in its normal fashion until it is determined that there has been another change in the actual line-rate.

As indicated by the above, while the presently-described embodiment responds to a determination that there has been a change in the actual line-rate by adjusting the count representing the length of the virtual queue (in order to cause—at least in the short-term immediately after the determination of a change in the actual line-rate—a change in the likelihood or amount of marking, dropping etc.), it will be understood that with other embodiments, other parameters of or associated with the virtual queue may be adjusted instead to cause the same, a similar, or a corresponding effect, i.e. an at least short-term change in the likelihood or amount of marking, dropping etc.). For example, instead of adjusting the count representing the length of the virtual queue, a corresponding (i.e. but mirror-image) adjustment may be made to the marking threshold, whereby to bring the threshold closer to the current level if a decrease in the actual line-rate has been identified (which would generally increase the chance that it will be appropriate to mark packets), and to move the threshold further from the current level if an increase in the actual line-rate has been identified (which would generally decrease the chance that it will be appropriate to mark packets). Such options are less easy to implement, as they may require a facility for storing an extra variable (a dynamic threshold) and a process for returning this to a predetermined threshold over the course of time.

This and some other possible implementation options will be discussed in brief below.

Some Implementation Options (a) Some Options for how to Update the Counter:

In situations where it is determined that the actual line-rate has increased, generally causing the danger of congestion to become (at least temporarily) lower, in preferred embodiments, the virtual queue level should generally be reduced to reflect this. Some possibilities for achieving this include the following:

Clearing the virtual queue (i.e. setting the counter level to 0). (As explained earlier, this option may be used on the grounds that it is relatively simple to implement.)

Calculating how much shorter the virtual queue would have been if it had emptied at the new rate for a round trip time (RTT), then adjusting the level of the virtual queue from its previous level $VQ_{old}$ to a new level $VQ_{new}$ as follows:

$VQ_{new}=VQ_{old}-$(change of VQ rate*RTT) [min $VQ_{new}=0$] (i.e. the square bracket symbolises that this adjustment may be made under the condition that $VQ_{new}$ cannot be less than 0, or some other pre-decided value.)

The reasoning for this is that it generally takes approximately one RTT for sources to react to marks.

The RTT may be measured directly (noting that this may be non-trivial, as RTT is generally different for each source-destination pair), estimated (e.g. if the network topology is such that all paths have or may be regarded as having similar RTTs) or assumed (e.g. a typical value for RTT may be assumed in some broadband scenarios; it would even be possible for the 'typical value' to be dependent on the technology, e.g. in the provision of broadband Internet access using Digital Subscriber Line (DSL) technology, interleaving is typically used more than for cable, so will have higher RTT).

Setting the length of the virtual queue to be equal to the length of the real queue (which will generally be less than the length of the virtual queue).

Deflating the length of the virtual queue by some arbitrary multiplier, e.g.

$VQ_{new}=VQ_{old}*$(old VQ rate/new VQ rate)

Variants of the above such as:

If new VQ rate>(1/θ*old VQ rate) then $VQ_{new}=0$, otherwise $VQ_{new}=VQ_{old}$ (i.e. clear the virtual queue if the rate has increased significantly, otherwise do nothing).

Combinations of the above, e.g. calculating the value according to the RTT method above, but with a minimum value equal to the length of the real queue.

Correspondingly, in situations where it is determined that the actual line-rate has decreased, generally causing the danger of congestion to become (at least temporarily) higher, in preferred embodiments, the virtual queue level should generally be increased to reflect this. Some possibilities for achieving this include the following:

Filling the virtual queue (i.e. setting the counter level to its maximum value). (This option may be used on the grounds that it is relatively simple to implement.)

Calculating how much longer the virtual queue would have been if it had emptied at the new rate for a round trip time, then adjusting the level of the virtual queue from its previous level $VQ_{old}$ to a new level $VQ_{new}$ as follows:

$VQ_{new}=VQ_{old}+$(change of VQ rate*RTT)[max $VQ_{new}=$max value]

Inflating the virtual queue by some arbitrary multiplier, e.g.

$VQ_{new}=VQ_{old}*$(old VQ rate/new VQ rate)

Variants of the above such as:

If new VQ rate<(θ*old VQ rate) then $VQ_{new}=$max, otherwise $VQ_{new}=VQ_{old}$ Combinations of the above.

As referred to briefly earlier, an alternative to adjusting the virtual queue's length (or counter level) is to adjust the virtual queue's threshold, "VQ_threshold" (i.e. the length of the virtual queue at which packets are dropped/marked/ etc.), i.e.:

If the real line-rate has decreased, then the threshold may be lowered (generally to some minimum value greater than its zero level).

If the real line-rate has increased, then the threshold may be increased (generally to some value less than its maximum value, VQ_maximum_level).

The change in threshold can be calculated in a manner corresponding to any of the possibilities mentioned above. This may be suitable because the behaviour of a communications system with a virtual queue is generally not very sensitive to such threshold values [as indicated with reference to the Zhang & Charny paper discussed earlier]. It may be less preferable, however, because if the threshold is lowered too far, the virtual queue may trigger marking/dropping/etc. too often, and if it increased too far, the virtual queue may not trigger marking/dropping/etc. early enough, i.e. the real queue will fill significantly or even overflow before marking/dropping triggers the source to slow down enough.

(b) Some Options for when to Update the Counter:

In "normal operation", the virtual queue length generally increases as packets arrive and decreases as packets depart—FIG. 3 shows the subcase where packets are only marked/dropped/etc. as they arrive, so it is essentially equivalent to calculating the virtual queue length only on packet arrival.

As explained earlier, according to preferred embodiments, the virtual queue length is adjusted in response to a determined change in the actual line-rate. This re-setting could be done as soon as it is determined that the line-rate has changed. An alternative may be to do the re-setting at the same time as the next time that a packet could be marked/dropped/etc. For example, in the subcase where packets are only marked/dropped/etc. as they arrive, so it is equivalent to re-setting the virtual queue length only on packet arrival (when the virtual queue length would be re-set according to the combined effect of the calculations in FIG. 3 and FIG. 5, i.e. "normal operation" with the adjustment contributed by the modified technique).

(c) Alternatives for how and when Data Items May be Marked/Dropped/Etc.:

In the preferred embodiments described above, packets are generally marked or dropped (or other types of action may be taken) on a packet-by-packet basis in dependence on whether the length of the virtual queue is above or below a threshold (or according to the state of the applicable queue metric). Such embodiments may be thought of as "deterministic", in the sense that the state of the applicable queue metric at a particular time determines whether the applicable action will be taken in respect of a particular packet.

In alternative embodiments, which may be thought of as "probabilistic" embodiments, there need not be a threshold determining whether or not marking, dropping or another action is taken in respect of a particular packet. Instead, action (marking/dropping/etc.) may be taken on a probabilistic basis, with the probability of action being taken in respect of each packet being dependent on the state of the applicable (virtual) queue metric at a particular time. In general, with such embodiments, the state of the (virtual) queue metric during a particular time period will result (on average) in a higher or lower percentage of the packets received during that period being marked/dropped/etc., and this percentage may therefore signal the desired measure of congestion (in a manner analogous to RED, discussed earlier, for example, but in a manner that can reflect the likelihood of congestion more quickly and/or more accurately than is possible with RED and other prior techniques).

Some Possible Causes of Changes to the Actual Line-Rate

The real line-rate might change for a variety of reasons, including, for example:

A wireless interface may adapt its rate because wireless conditions have changed.

The DSL rate may be adapted, using a Digital Line Management (DLM) technique, for example.

The DSL rate may be unchanged, but multicast may start or stop.

On an optical link, another wavelength may be used, or its use may be stopped.

A bonded link may add another bond.

More generally, a virtual link may add another underlying path.

A customer's upstream rate in a broadband network (DSL or cable) may be limited by a 'fair usage' policy (which prevents one user using too much of an amount of shared bandwidth, for example), where the cap depends on whether the consumer's recent traffic is above or below their policy limit, for example.

In the case of DSL (where a Broadband Remote Access Server (BRAS or B-RAS) routes traffic to and from broadband remote access devices such as Digital Subscriber Line Access Multiplexers (DSLAMs) on an Internet service providers (ISP's) network), on the BRAS side, the DSL rate can change frequently with DLM but even more often in the case of a network where Multicast will alter the speed of the line when a multicast session is active downstream of the BRAS. With multicast the BRAS speed of a Virtual Circuit (VC) may have to be altered to:

NEW_VC_Speed=Original_VC_Speed−Multicast Rate.

This may be required to avoid packet loss of prioritised traffic on the BRAS as a Multi-Service Access Node (MSAN)—which is a device typically installed in a telephone exchange or in a cabinet, and which connects customers' telephone lines to the core network to provide telephone, ISDN, and broadband such as DSL all from a single platform—is generally not QoS aware.

In alternative implementations, the network element (or a module thereof responsible for determining that there has been a change in the actual line-rate) may be informed of (or otherwise determine) the absolute value of the new or current line-rate, or may be told (or otherwise determine) of changes in the line-rate.

Virtual queues are normally considered in the context of a node that forwards packets. However they can also be used for nodes that perform general packet processing or other types of processing of "requests for service", for example communications functions such as deep packet inspection, firewalling and other middle-box functions, or a generic server blade such as used in Software-Defined Networking (SDN).

In such cases, the method may apply is the same or a similar way, where 'real (or virtual) line-rate' is replaced (respectively) by 'real (or virtual) rate of processing packets'.

So there could be a step change in the rate at which the node can process packets. For example, a node with a server blade could switch off one of its blade's cores (perhaps to save energy) or activate another core, or the node could realise that it was having to do more processing per packet (and therefore the 'real rate of processing packets' was lower). Reasons could be that the node is a firewall protecting an enterprise that is under a sudden attack, so more rigorous screening of each packet is needed, or because more complex header compression or DPI operations are suddenly needed.

In all these cases a node probably has a control and/or management system that controls and/or monitors the processing function which will know that more processing per packet is needed, or that a new core has been activated. The virtual queue can (as before) explicitly request, or be informed, or know itself, the new 'real rate of processing packets'.

The invention claimed is:

1. A method of processing data items received at a network element in a communications network, the network element being operable to forward data items at a rate up to a forwarding rate, the forwarding rate being subject to variation; the network element having a queue for data items awaiting forwarding and having a counter associated therewith, the counter maintaining a count in dependence on which a queue metric is derivable according to a predetermined algorithm; the method comprising:
updating the count at a rate dependent on the forwarding rate;
further updating the count in response to receipt of data items; and
signalling a measure of congestion in respect of the network element in dependence on said queue metric;
the method being characterised by further comprising:
determining if there has been a variation in the forwarding rate, and in response to a determination that there has been a variation in the forwarding rate:
altering the rate at which the count is being updated in accordance with the variation in the forwarding rate; and
adjusting the counter in dependence on the variation in the forwarding rate whereby to cause a change in the queue metric.

2. A method according to claim 1 wherein the forwarding rate signifies the number of data items that the network element is operable to forward in a unit of time.

3. A method according to claim 1 wherein the forwarding rate signifies the volume of data that the network element is operable to forward in a unit of time.

4. A method according to claim 1 wherein the step of further updating the count is performed in dependence on the number of data items received and/or the rate at which data items are received.

5. A method according to claim 1 the step of further updating the count is performed in dependence on the volume of data received and/or the rate at which data is received.

6. A method according to claim 1 wherein the queue metric is a measure of the level of the count.

7. A method according to claim 1 wherein the queue metric is an averaged measure dependent on measures of the level of the count over a period of time.

8. A method according to claim 1 wherein the queue metric is a measure of disparity between the count and a counter threshold.

9. A method according to claim 8, wherein adjusting the counter in response to a determination that there has been a variation in the forwarding rate comprises updating the count.

10. A method according to claim 8, wherein adjusting the counter in response to a determination that there has been a variation in the forwarding rate comprises updating the counter threshold.

11. A method according to claim 1 wherein the step of signalling a measure of congestion comprises determining whether or not to perform one or more signalling actions in respect of said data items in dependence on the state of said queue metric and performing or not performing said one or more signalling actions in dependence on said determination.

12. A method according to claim 1 wherein the step of signalling a measure of congestion comprises performing one or more signalling actions in respect of said data items with a probability dependent on said queue metric.

13. A method according to claim 1 wherein the step of signalling a measure of congestion comprises performing one or more signalling actions in respect of said data items to an extent dependent on said queue metric.

14. A method according to claim 1 wherein the step of signalling a measure of congestion comprises performing one or more of the following signalling actions in respect of one or more of said data items in dependence on said queue metric: marking, dropping; truncating; delaying; de-prioritising; re-routing; forwarding to a destination other than an intended destination; issuing an out-of-band congestion notification.

15. A method of processing requests for service received at a processing element, the processing element being operable to process requests for service at a rate up to a processing rate, the processing rate being subject to variation; the processing element having a queue for requests awaiting processing and having a counter associated therewith, the counter maintaining a count in dependence on which a queue metric is derivable according to a predetermined algorithm; the method comprising:
updating the count at a rate dependent on the processing rate;
further updating the count in response to receipt of requests for service; and
signalling a measure of congestion in respect of the processing element in dependence on said queue metric;
the method being characterised by further comprising:
determining if there has been a variation in the processing rate, and in response to a determination that there has been a variation in the processing rate:
altering the rate at which the count is being updated in accordance with the variation in the processing rate; and
adjusting the counter in dependence on the variation in the processing rate whereby to cause a change in the queue metric.

16. Apparatus operable to perform processing of data items, the apparatus comprising:
a network element in a communications network, the network element including at least a first interface via which data items arrive at the network element and at least a second interface via which data items are forwarded from the network element so as to forward the data items at a rate up to a forwarding rate, the forwarding rate being subject to variation; the network element having a queue for data items awaiting forwarding and having a counter associated therewith, the counter maintaining a count in dependence on which a queue metric is derivable according to a predetermined algorithm; and
a processing system, including a processor at least being configured to:
update the count at a rate dependent on the forwarding rate;

further update the count in response to receipt of data items; and signal a measure of congestion in respect of the network element in dependence on said queue metric; and determine if there has been a variation in the forwarding rate, and in response to a determination that there has been a variation in the forwarding rate:
- alter the rate at which the count is being updated in accordance with the variation in the forwarding rate; and
- adjust the counter in dependence on the variation in the forwarding rate whereby to cause a change in the queue metric.

17. An apparatus for processing requests for service, the apparatus comprising:

a processing element including at least a first interface via which data items arrive at the processing element and at least a second interface via which data items are forwarded from the processing element, the processing element being operable to process requests for service at a rate up to a processing rate, the processing rate being subject to variation; the processing element having a queue for requests awaiting processing and having a counter associated therewith, the counter maintaining a count in dependence on which a queue metric is derivable according to a predetermined algorithm; and a processing system, including a processor at least being configured to:
update the count at a rate dependent on the processing rate;

further update the count in response to receipt of requests for service; and signal a measure of congestion in respect of the processing element in dependence on said queue metric; and determine if there has been a variation in the processing rate, and in response to a determination that there has been a variation in the processing rate:
- alter the rate at which the count is being updated in accordance with the variation in the processing rate; and
- adjust the counter in dependence on the variation in the processing rate whereby to cause a change in the queue metric.

* * * * *